(12) United States Patent
Zhuang et al.

(10) Patent No.: US 12,113,356 B2
(45) Date of Patent: Oct. 8, 2024

(54) PHOTOVOLTAIC POWER GENERATION SYSTEM AND METHOD FOR CONTROLLING POWER BALANCE

(71) Applicant: Sungrow Power Supply Co., Ltd., Hefei (CN)

(72) Inventors: Jiacai Zhuang, Hefei (CN); Wei Liu, Anhui (CN); Jun Xu, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 225 days.

(21) Appl. No.: 17/703,742

(22) Filed: Mar. 24, 2022

(65) Prior Publication Data

US 2022/0376497 A1   Nov. 24, 2022

(30) Foreign Application Priority Data

May 24, 2021 (CN) .......................... 202110565248.2

(51) Int. Cl.
*H02J 1/00* (2006.01)
*H02J 1/10* (2006.01)
*H02J 1/12* (2006.01)
*H02S 40/30* (2014.01)

(52) U.S. Cl.
CPC ............... *H02J 1/106* (2020.01); *H02J 1/12* (2013.01); *H02S 40/30* (2014.12); *H02J 2300/24* (2020.01)

(58) Field of Classification Search
CPC ........... H02J 1/106; H02J 1/12; H02J 2300/24
See application file for complete search history.

(56) References Cited

U.S. PATENT DOCUMENTS

| | | | | |
|---|---|---|---|---|
| 3,990,303 | A * | 11/1976 | Reeves .................. | F02P 17/12 324/381 |
| 5,614,828 | A * | 3/1997 | Sims .................... | G01R 31/006 324/402 |
| 10,998,723 | B1 | 5/2021 | Huang et al. | |

(Continued)

FOREIGN PATENT DOCUMENTS

CN   104953945 A   9/2015
CN   104378068 B   3/2018

(Continued)

OTHER PUBLICATIONS

Extended European Search Report for European Application No. 22161810.1, dated Sep. 30, 2022.

(Continued)

*Primary Examiner* — Jue Zhang
*Assistant Examiner* — Afework S Demisse
(74) *Attorney, Agent, or Firm* — Wolf, Greenfield & Sacks, P.C.

(57) ABSTRACT

A photovoltaic power generation system and a method for controlling power balance are provided. The system includes at least two photovoltaic arrays, at least one power balance circuit and a power converter. Each of input ports of the power balance circuit is connected with at least one photovoltaic array, and an output port of the power balance circuit is connected with the power converter. The power balance circuit performs power transfer based on a difference between output powers of the two photovoltaic arrays to control a difference between powers of two output terminals of the power balance circuit to be within a preset range.

11 Claims, 6 Drawing Sheets

(56) References Cited

U.S. PATENT DOCUMENTS

| | | |
|---|---|---|
| 2010/0308660 A1 | 12/2010 | Willis |
| 2014/0152107 A1 | 6/2014 | Shimada |
| 2014/0265586 A1 | 9/2014 | Willis |
| 2016/0254672 A1 | 9/2016 | Yoscovich et al. |
| 2021/0036515 A1 | 2/2021 | Lehn et al. |

FOREIGN PATENT DOCUMENTS

| | | |
|---|---|---|
| CN | 111049376 A | 4/2020 |
| CN | 112054503 A | 12/2020 |
| JP | 2011-008348 A | 1/2011 |

OTHER PUBLICATIONS

Essakiappan et al., Multilevel medium-frequency link inverter for utility scale photovoltaic integration. IEEE transactions on power electronics. Jul. 2014;30(7):3674-84.

Li et al., Input-independent and output-series connected modular DC-DC converter with intermodule power balancing units for MVdc integration of distributed Pv. IEEE Transactions on Power Electronics. Feb. 2019;35(2):1622-36.

Examination Report for Indian Application No. 202214019428, dated Dec. 28, 2022.

Chinese Office Action dated Jul. 27, 2023, in connection with Chinese Application No. 202110565248.2.

\* cited by examiner

PHOTOVOLTAIC POWER GENERATION SYSTEM AND METHOD FOR CONTROLLING POWER BALANCE

The present disclosure claims the priority to Chinese Patent Application No. 202110565248.2, titled "PHOTOVOLTAIC POWER GENERATION SYSTEM AND METHOD FOR CONTROLLING PHOTOVOLTAIC POWER GENERATION SYSTEM", filed on May 24, 2021, with the China National Intellectual Property Administration, the content of which is incorporated herein by reference.

TECHNICAL FIELD

The present disclosure relates to the technical field of new energy power generation, and in particular to a photovoltaic power generation system and a method for controlling power balance.

BACKGROUND

With the increase of the voltage of the photovoltaic power generation system, multiple photovoltaic modules are connected in series to output. However, due to various reasons, such as different attenuations of photovoltaic modules and differences in output performances of photovoltaic modules caused by shading, different photovoltaic modules have different output powers, that is, mismatch of photovoltaic modules.

The mismatch problem becomes serious as the number of the photovoltaic modules connected in series increases. According to the conventional technology, the mismatch problem is solved by using a DC/DC converter. However, according to the conventional solutions, it is required that the power of the DC/DC converter is greater than or equal to the powers of all the photovoltaic modules to solve the problem of battery module mismatch. The cost and volume of the DC/DC converter are positively correlated with the power of the DC/DC converter. Therefore, with the solutions for solving the mismatch of photovoltaic modules according to the conventional technology, the cost and volume of the DC/DC converter are large.

SUMMARY

In view of this, a photovoltaic power generation system and a method for controlling power balance are provided according to the present disclosure, to solve the problem of large cost and volume of the DC/DC converter in the solutions for solving mismatch of photovoltaic modules according to the conventional technology. The following technical solutions are provided according the present disclosure.

A photovoltaic power generation system is provided according to a first aspect of the present disclosure. The photovoltaic power generation system includes at least two photovoltaic arrays, at least one power balance circuit and a power converter. Each of the photovoltaic arrays includes at least two photovoltaic strings connected in parallel. Each of two input ports of the power balance circuit is connected to at least one photovoltaic array. The two input ports of the power balance circuit are connected to different photovoltaic arrays. An output port of the power balance circuit is connected to the power converter. The power balance circuit is configured to, in a case that a mismatching degree of the photovoltaic arrays respectively connected to the two input ports exceeds an allowable range, perform power transfer based on a difference between output powers of the connected photovoltaic arrays to control a difference between powers of two output terminals of the power balance circuit to be within a preset range.

In an embodiment of the first aspect, a neutral point of the power balance circuit is grounded via an impedance circuit.

In an embodiment of the first aspect, the power balance circuit further includes a first switching circuit connected in series with the impedance circuit.

In an embodiment of the first aspect, a second switching circuit is connected in series between the output port of the power balance circuit and the power converter.

In an embodiment of the first aspect, each of the input ports of the power balance circuit is connected to at least two photovoltaic arrays connected in parallel. Alternatively, each of the input ports of the power balance circuit is connected to an output terminal of a DC/DC converter, and an input terminal of the DC/DC converter is connected to at least one photovoltaic array. Alternatively, each of the input ports of the power balance circuit is connected to at least two DC/DC converters of which output terminals are connected in parallel, and an input terminal of each of the DC/DC converters is connected to at least one photovoltaic array.

In an embodiment of the first aspect, the photovoltaic power generation system includes two or more power balance circuits. Input ports of the two power balance circuits are connected to different photovoltaic arrays, and output ports of the power balance circuits are connected in parallel.

In an embodiment of the first aspect, a first input port of the power balance circuit includes a first input terminal and a second input terminal, a second input port of the power balance circuit includes a third input terminal and a fourth input terminal, and the output port of the power balance circuit includes a first output terminal and a second output terminal. The first input terminal is connected to the first output terminal, and the fourth input terminal is connected to the second output terminal. A series switching branch is connected between the first output terminal and the second output terminal, and the series switching branch includes at least two control switches. The second input terminal is connected to the third input terminal, and then the second input terminal and the third input terminal are connected to a common point of the two control switches in the series switch branch via an inductive impedance. A common point of the second input terminal and the third input terminal serves as the neutral point of the power balance circuit.

In an embodiment of the first aspect, a first input port of the power balance circuit includes a first input terminal and a second input terminal, a second input port of the power balance circuit includes a third input terminal and a fourth input terminal, and the output port of the power balance circuit includes a first output terminal and a second output terminal. In a case that the power balance circuit includes a DC/DC converter, the second input terminal and the third input terminal are respectively connected to two input terminals of the DC/DC converter, a positive output terminal of the DC/DC converter is connected to the first output terminal of the power balance circuit, the first input terminal is connected to the first output terminal, the fourth input terminal is connected to the second output terminal, and the positive input terminal of the DC/DC converter serves as the neutral point of the power balance circuit; or the second input terminal and the third input terminal are respectively connected to two input terminals of the DC/DC converter, a positive Output terminal of the DC/DC converter is connected to the second output terminal of the power balance circuit, the first input terminal is connected to the first output terminal, the fourth input terminal is connected to the second output terminal, and a negative output terminal of the DC/DC converter serves as the neutral point of the power balance circuit.

A method for controlling power balance is provided according to a second aspect of the present disclosure. The method includes: detecting a mismatching degree of photovoltaic arrays respectively connected to two input ports of a power balance circuit; and in a case that the mismatching degree exceeds an allowable range, activating the power balance circuit and controlling the power balance circuit to perform power transfer based on a difference between output powers to control a difference between powers of two output terminals of the power balance circuit to be within a preset range.

In an embodiment of the second aspect, a neutral point of the power balance circuit is grounded via an impedance circuit and a first switching circuit that are connected in series. The method further includes: maintaining a first switching circuit in a closed state before closing a second switching circuit; and controlling the first switching circuit to be opened after closing the second switching circuit.

The photovoltaic power generation system according to the present disclosure includes at least two photovoltaic arrays, at least one power balance circuit and a power converter. Each of the photovoltaic arrays includes at least two photovoltaic strings connected in parallel. Each of two input ports of the power balance circuit is connected to at least one photovoltaic array. The two input ports of the power balance circuit are connected to different photovoltaic arrays. An output port of the power balance circuit is connected to the power converter. The power balance circuit is configured to perform power transfer based on a difference between output powers of the photovoltaic arrays connected to the two input ports to control a difference between powers of output terminals of the power balance circuit to be within a preset range. With the system according to the present disclosure, it is only required for the power balance circuit to transfer at most a half of a difference between output powers of the two photovoltaic arrays to control the power of the output port to meet requirements. A maximum difference between the output powers of the two photovoltaic arrays is equal to a rated output power of one photovoltaic array. Therefore, a half of the difference of the output powers is equal to a half of the rated output power of one photovoltaic array. The problem of component mismatch can be solved by controlling a maximum power of the power balance circuit to be less than or equal to a quarter of the rated output powers of the two photovoltaic arrays. It can be seen that, compared with the solutions for solving the problem of component mismatch according to the conventional technology, the power and the volume of the power balance module are greatly reduced according to the present disclosure.

BRIEF DESCRIPTION OF THE DRAWINGS

In order to illustrate technical solutions in embodiments of the present disclosure or the conventional technology more clearly, hereinafter drawings to be used in the description of the embodiments or the conventional technology are described simply. Apparently, the drawings described below are only for the embodiments of present disclosure. For those skilled in the art, other drawings may be obtained based on the provided drawings without any creative work.

DETAILED DESCRIPTION

Figure 1:
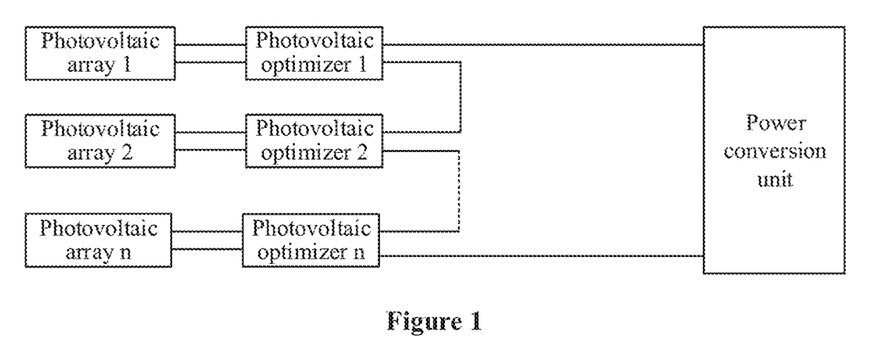
FIG. 1 shows a schematic structural diagram of a photovoltaic power generation system according to the conventional technology.

Reference is made to FIG. 1, which shows a schematic structural diagram of a photovoltaic power generation system according to the conventional technology. In the solution according to the conventional technology, a converter (that is, a photovoltaic optimizer) is connected in series to the output ports of photovoltaic modules to decouple the photovoltaic string from a subsequently connected power conversion unit, thereby solving the problem of battery string mismatch. However, in this solution, the converter is connected in series with the photovoltaic string, thus it is required for the converter to transfer all the power of the photovoltaic string, that is, it is required that the power of the converter is greater than or equal to the power of the photovoltaic string to solve the problem of photovoltaic string mismatch. The cost and volume of the converter are usually positively correlated with the power of the converter, thus the cost and volume of the converter in the solution are large. Therefore, if the problem of photovoltaic string mismatch is solved by performing power transfer, advantages in cost and volume of the converter can be achieved.

In order to solve the above problems, a photovoltaic power generation system is provided according to the present disclosure. The photovoltaic power generation system includes at least two photovoltaic arrays, at least one power balance circuit and a power converter. Each of two input ports of the power balance circuit is connected to at least one photovoltaic array, and the two input ports of the power balance circuit are connected to different photovoltaic arrays. An output port of the power balance circuit is connected to the power converter. The power balance circuit performs power transfer based on a difference between output powers of the photovoltaic arrays connected to the two input ports to control a difference between powers of two output terminals of the power balance circuit to be within a preset range. According to the present disclosure, it is only required for the power balance circuit to transfer at most a half of the difference between output powers of the two photovoltaic arrays to balance the powers of the output ports. A maximum difference between the output powers of the two photovoltaic arrays is equal to a rated output power of one photovoltaic array. Therefore, a half of the difference between the output powers is equal to a half of the rated output power of one photovoltaic array. Therefore, a half of the difference of the output powers is equal to a half of the rated Output power of one photovoltaic array. The problem of component mismatch can be solved by controlling a maximum power of the power balance circuit to be less than or equal to a quarter of the rated output powers of the two photovoltaic arrays. It can be seen that according to the present disclosure, the power and the volume of the power balance module are greatly reduced.

In order to make the objectives, technical solutions and advantages of the embodiments according to the present disclosure clearer, the technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. Based on the embodiments of the present disclosure, all other embodiments obtained by those skilled in the art without any creative work fall within the protection scope of the present disclosure.

Figure 2:
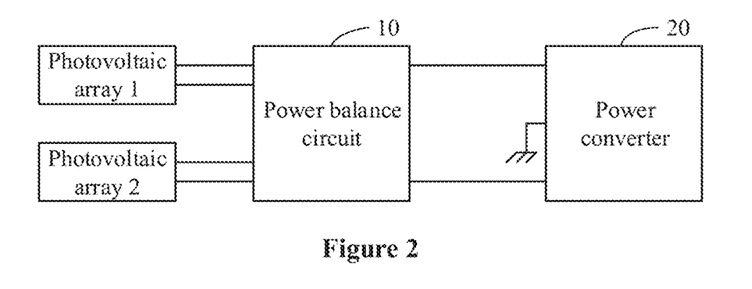
FIG. 2 shows a schematic structural diagram of a photovoltaic power generation system according to an embodiment of the present disclosure.

Reference is made to FIG. 2, which shows a schematic structural diagram of a photovoltaic power generation system according to an embodiment of the present disclosure. In the embodiment, a photovoltaic power generation system including one power balance circuit and two photovoltaic arrays is taken as an example. Apparently, in other embodiments, the number of the power balance circuit may be two or more, and the number of the photovoltaic array may be more than two.

As shown in FIG. 2, the photovoltaic power generation system includes a photovoltaic array 1, a photovoltaic array 2, a power balance circuit 10 and a power converter 20. The photovoltaic array 1 and the photovoltaic array 2 are connected in series to operate.

The photovoltaic arrays output a direct current signal. The power balance circuit 10 is configured to balance the output powers of the two photovoltaic arrays. The power converter 20 is configured to perform conversion (for example, DC/DC conversion or inversion) on an inputted electric signal and provide the electric signal after conversion to a subsequent component.

In an embodiment, a neutral point of the power converter 20 is grounded to obtain a positive voltage relative to ground or a negative voltage relative to ground, so that the voltage relative to ground of the photovoltaic array meets a safety regulation.

The power balance circuit 10 includes two input ports and one output port. One of the two input ports is connected to the photovoltaic array 1, and the other one of the two input ports is connected to the photovoltaic array 2. The output port is connected to the power converter 20.

The power balance circuit 10 is configured to control the two photovoltaic arrays to operate in series, and perform power transfer a power based on a difference between output powers of the two photovoltaic arrays to control a difference between powers, to be transmitted to the power converter, of two output terminals of the power balance circuit 10 to be within a preset range.

Since the photovoltaic array 1 and the photovoltaic array 2 are connected in series to operate, voltages outputted by the two photovoltaic arrays are different in a case that the difference between the output powers of the two photovoltaic arrays exceeds the preset range, resulting in an abnormal output of the photovoltaic arrays connected in series. According to the present disclosure, the power balance circuit is configured to transfer a half of the difference between the output powers of the two photovoltaic arrays connected in series, so that voltages of the two output terminals of the power balance circuit 10 relative to the neutral point are the same and currents of the two output terminals are the same, that is, the difference between the powers of the two output terminals is within the preset range.

For example, in a case that an output power of the photovoltaic array 1 is equal to P1, an output power of the photovoltaic array 2 is equal to P2 and P1 is less than P2, it is only required for the power balance circuit 10 to transfer a power of (P2−P1)/2 to balance the powers of the photovoltaic array 1 and the photovoltaic array 2.

In a case that an output power of one of the two photovoltaic arrays is equal to a rated power P, and the other one of the two photovoltaic arrays has no output power, the difference between powers of the two photovoltaic arrays is equal to the rated power P of one of the photovoltaic arrays, so that it is required for the power balance circuit to transfer a power of P/2. Therefore, power balance in an extreme operation condition can be achieved by controlling a maximum power of the power balance circuit to be equal to a quarter of the rated power of the two photovoltaic arrays.

A method for controlling power balance is further provided according to an embodiment of the present disclosure. In the method, it is determined whether to activate the power balance circuit according to actual requirements. The method includes the following steps S1 and S2.

In step S1, it is detected whether a mismatching degree of two photovoltaic arrays respectively connected to two input ports of a power balance circuit is within an allowable range.

In an embodiment of the present disclosure, the mismatching degree of the photovoltaic arrays may be determined by directly calculating output powers of the two photovoltaic arrays. In a case that a difference between the output powers exceeds a preset range, it is determined that the mismatching degree of the two photovoltaic arrays exceeds the allowable range. In a case that a difference between the output powers is within a preset range, it is determined that the mismatching degree of the two photovoltaic arrays is within the allowable range.

In another embodiment of the present disclosure, the mismatching degree may be determined by detecting output voltages of the two photovoltaic arrays. For example, the mismatching degree may be determined by comparing an output voltage of one of the photovoltaic arrays with a maximum voltage threshold or comparing a difference between output voltages of the two photovoltaic arrays with a voltage difference threshold. For example, in a case that the difference between the output voltage of the two photovoltaic arrays is greater than or equal to a preset value, it is determined that the mismatching degree of the two photovoltaic arrays exceeds the allowable range; and in a case that the difference between the output voltage is less than a preset value, it is determined that the mismatching degree is within the allowable range.

In an embodiment, the power balance circuit may detect the output voltages of the photovoltaic arrays by using a voltage detection module. In another embodiment, the power balance circuit may obtain the output voltages of the photovoltaic arrays from another voltage detection device (such as a subsequently connected power converter).

In another embodiment of the present disclosure, the mismatching degree of the photovoltaic arrays is determined by detecting a voltage of a neutral point of the power balance circuit relative to ground. For example, in a case that the voltage of the neutral point relative to ground is greater than a preset value, it is determined that the mismatching degree exceeds the allowable range.

In step S2, in a case that the mismatching degree of the photovoltaic arrays exceeds the allowable range, the power balance circuit is activated, and the power balance circuit is controlled to perform power transfer based on the difference between output powers to control a difference between powers of two output terminals of the power balance circuit to be within a preset range.

In a case that the mismatching degree of the two photovoltaic arrays connected to the power balance circuit is within the allowable range, the power balance circuit is not activated. In a case that the mismatching degree of the two photovoltaic arrays exceeds the allowable range, the power balance circuit is activated to balance the powers of the two photovoltaic arrays.

Figure 3A:
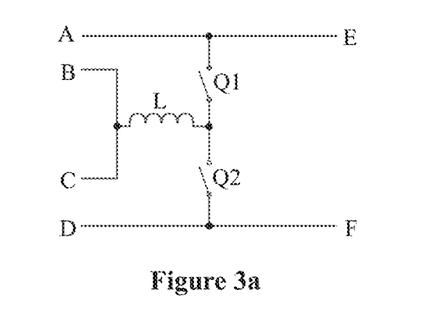
FIG. 3a shows a topology diagram of a power balance circuit according to an embodiment of the present disclosure.

In an embodiment of the present disclosure, reference is made to FIG. 3a, which shows a topology diagram of an equivalent circuit of a power balance circuit 10 according to an embodiment of the present disclosure. In FIG. 3a, a first input port of the power balance circuit includes a first input terminal A and a second input terminal B, a second input port of the power balance circuit includes a third input terminal C and a fourth input terminal D, and the output port of the power balance circuit includes a first output terminal E and a second output terminal F.

As shown in FIG. 3a, the first input terminal A is connected to the first output terminal E, and the fourth input terminal D is connected to the second output terminal F. A series switching branch is connected between the first output terminal E and the second output terminal F. The series switching branch includes at least two control switches Q1 and Q2. The second input terminal B is connected to the third input terminal C, and then the second input terminal B and the third input terminal C are connected to a common point (that is, a common terminal of Q1 and Q2) of the two control switches in the series switch branch via an inductive impedance L.

Terminals A and B are connected to an output terminal of the photovoltaic array 1, terminals C and D are connected to an output terminal of the photovoltaic array 2, and terminals E and F are connected to an input terminal of the power converter 20.

Figure 3B:
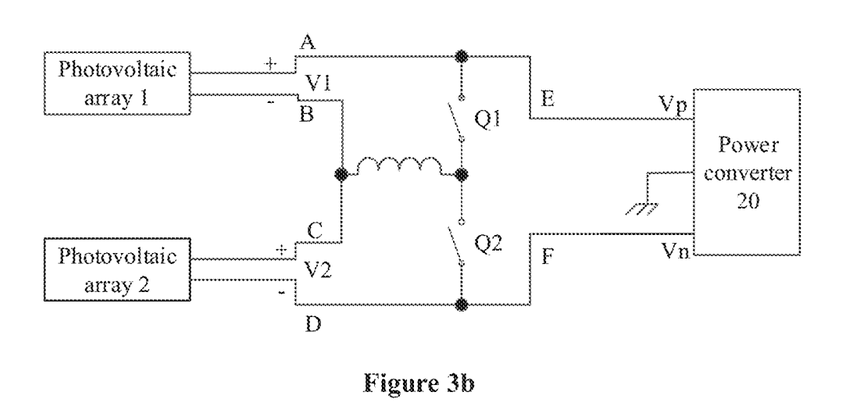
FIG. 3b shows a topology diagram of a photovoltaic power generation system in which the power balance circuit shown in FIG. 3a is applied according to an embodiment of the present disclosure.

As shown in FIG. 3b, in a case that the photovoltaic array 1 and the photovoltaic array 2 are mismatched, a voltage V1 between terminals A and B is different from a voltage V2 between terminals C and D. In this case, power transfer is performed by control the states of the control switches Q1 and Q2, thus the voltage and current at the first output terminal E are respectively equal to the voltage and current at the second output terminal F, balancing the output powers of the two photovoltaic arrays, and thereby ensuring that the powers received by a subsequently connected power converter via two input terminals are the same.

Figure 4:
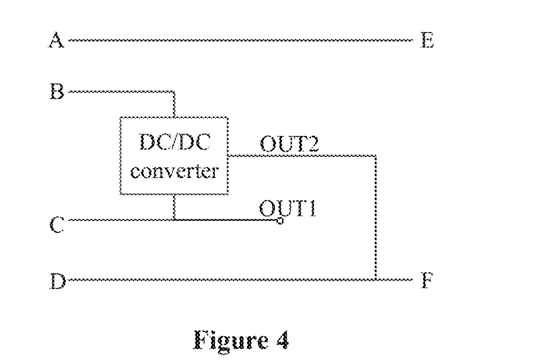
FIG. 4 shows a topology diagram of a power balance circuit according to another embodiment of the present disclosure.

In another embodiment of the present disclosure, the power balance circuit further includes a DC/DC converter. Reference is made to FIG. 4, which shows a topology diagram of an equivalent circuit of a power balance circuit according to another embodiment of the present disclosure.

As shown in FIG. 4, the second input terminal B and the third input terminal C are respectively connected to two input terminals of the DC/DC converter, and an output terminal OUT2 of the DC/DC converter is connected to the second output terminal F.

Similar to the operation principle of the power balance circuit shown in FIG. 3a, in a case that the voltage between the first input terminal A and the second input terminal B is different from the voltage between the third input terminal C and the fourth input terminal D, the DC/DC converter performs power transfer to control the power of the first output terminal E is equal to the power of the second output terminal F, that is, the powers of the two photovoltaic arrays are balanced by using the power balance circuit.

Figure 5:
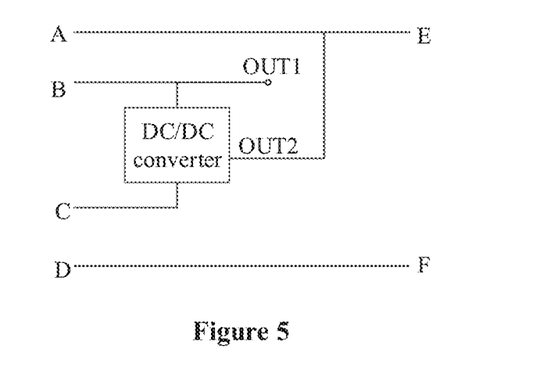
FIG. 5 shows a topology diagram of a power balance circuit according to another embodiment of the present disclosure.

In another embodiment, as shown in FIG. 5, the output terminal OUT2 of the DC/DC converter in the power balance circuit is connected to the first output terminal E of the power balance circuit 10. In a case that the voltage between the first input terminal A and the second input terminal B is different from the voltage between the third input terminal C and the fourth input terminal D, the DC/DC converter performs power transfer to control the power of the first output terminal F is equal to the power of the second output terminal F, that is, the powers of the two photovoltaic arrays are balanced by using the power balance circuit.

With the photovoltaic power generation system according to the embodiments of the present disclosure, it is only required for the power balance circuit to transfer a half of the difference between output powers of the two photovoltaic arrays to balance the powers of the two photovoltaic arrays. A maximum difference between the output powers of the two photovoltaic arrays is equal to the rated output power of one photovoltaic array. Therefore, a half of the difference between the output powers is equal to a half of the rated output power of one photovoltaic array. The problem of component mismatch can be solved by controlling a maximum power of the power balance circuit to be less than or equal to a quarter of the rated output powers of the two photovoltaic arrays. It can be seen that according to the present disclosure, the power and the volume of the power balance module are greatly reduced.

Moreover, with the photovoltaic power generation system according to the present disclosure, the power balance circuit may be activated according to the actual requirements, and the operation power of the power balance circuit is determined based on the output powers or output voltages of the two photovoltaic arrays, further reducing loss generated by the power conversion, thereby improving efficiency of the system.

In an application scenario of the present disclosure, multiple photovoltaic arrays share a maximum power point tracking (MPPT) system in a subsequently connected power converter. In this application scenario, an output terminal of the photovoltaic array is directly connected to an input port of the power balance circuit. As shown in FIG. 1, the photovoltaic array 1 is connected to an input port of a power balance circuit, and the photovoltaic array 2 is connected to another input port of the power balance circuit.

Figure 6:
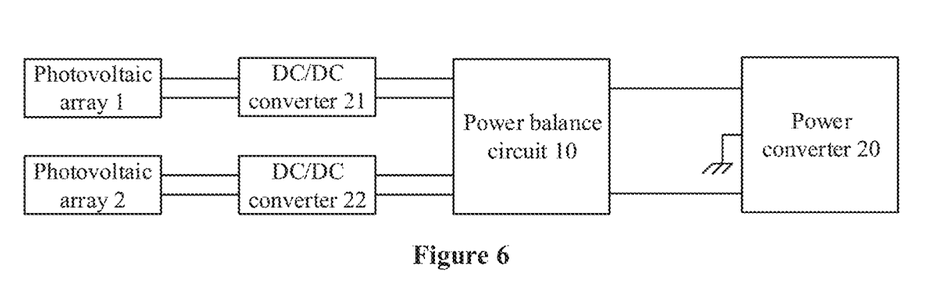
FIGS. 6 to 9 show topology diagrams of a photovoltaic power generation system according to other embodiments of the present disclosure.

In another application scenario of the present disclosure, each of the photovoltaic arrays is arranged with a maximum power point tracking system. In this application scenario, as shown in FIG. 6, an output terminal of the photovoltaic array is connected to an input terminal of a DC/DC converter, and an output terminal of the DC/DC converter is connected with an input port of a power balance circuit.

Figure 7:
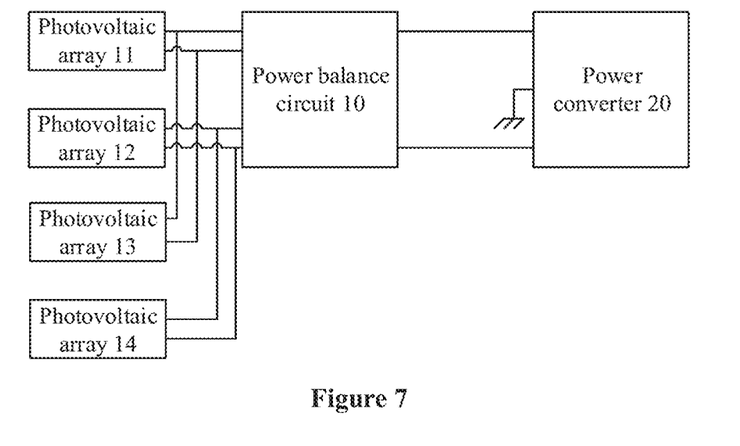

In another embodiment of the present disclosure, output ports of at least two photovoltaic arrays are connected in parallel, and then are connected to an input port of the power balance circuit. As shown in FIG. 7, a photovoltaic array 11 and a photovoltaic array 13 are connected in parallel, and then are connected to an input port of a power balance circuit, and a photovoltaic array 12 and a photovoltaic array 14 are connected in parallel, and then are connected to another input port of the power balance circuit.

Figure 8:
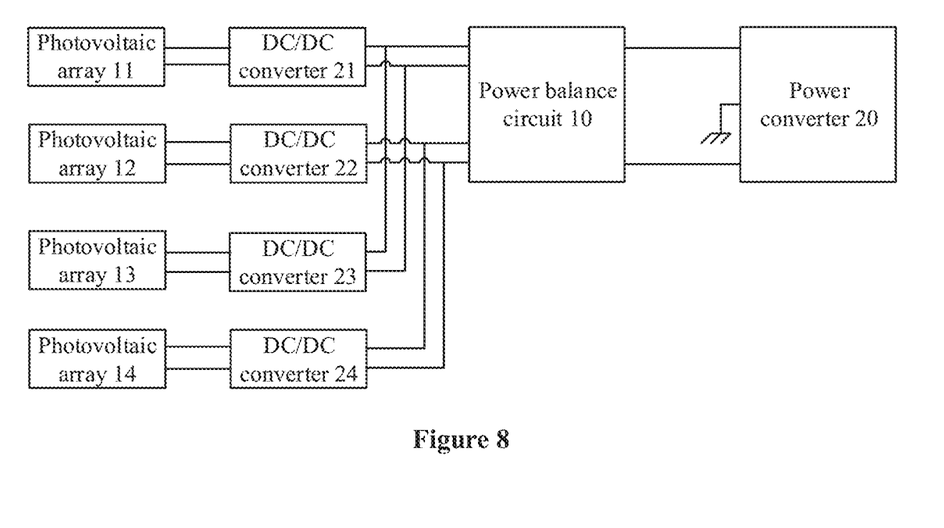

In another embodiment of the present disclosure, a photovoltaic array is connected in series with a DC/DC converter as a photovoltaic array unit, and each of input ports of a power balance circuit 10 is connected to at least two photovoltaic array units connected in parallel. As shown in FIG. 8, one photovoltaic array unit includes a photovoltaic array 11 and a DC/DC converter 21 that are connected with each other, another photovoltaic array unit includes a photovoltaic array 12 and a DC/DC converter 22 that are connected with each other. The two photovoltaic array units are connected in parallel, and then are connected to an input port of a power balance circuit. In the same way, another input port of the power balance circuit is connected to the other two photovoltaic array units connected in parallel.

Figure 9:
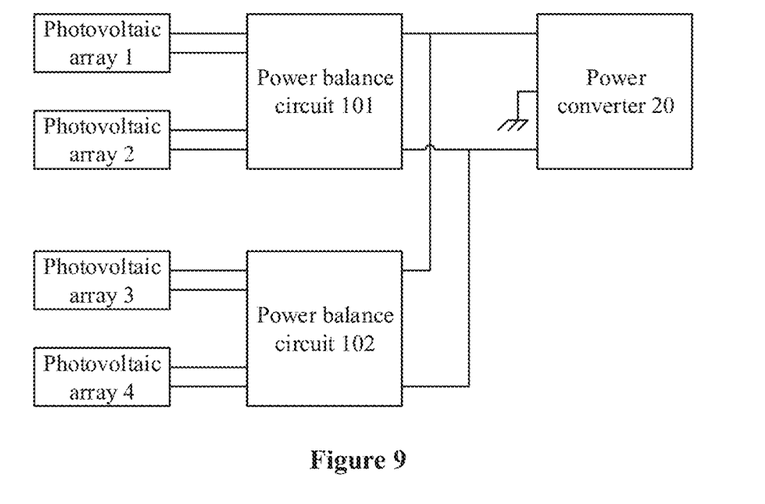

In another embodiment of the present disclosure, the photovoltaic power generation system includes two or more power balance circuits. As shown in FIG. 9, input ports of the power balance circuits are connected to different photovoltaic arrays. Output ports of the power balance circuits are connected in parallel, and then are connected to the power converter 20.

Each of the photovoltaic arrays in FIG. 9 may be any one of the photovoltaic arrays shown in FIGS. 6 to 8, which is not repeated herein.

Figure 10:
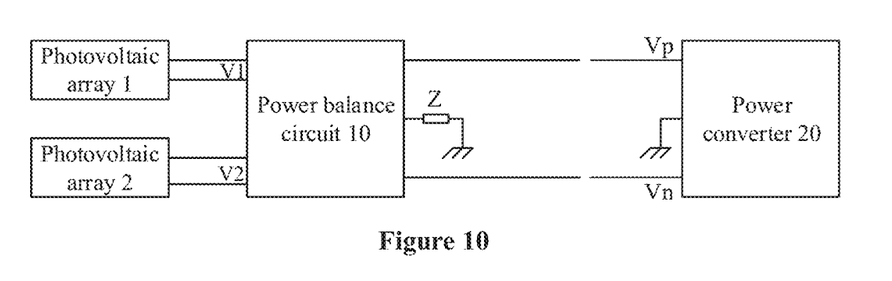
FIG. 10 shows a schematic structural diagram of a photovoltaic power generation system according to another embodiment of the present disclosure.

Reference is made to FIG. 10, which shows a schematic structural diagram of a photovoltaic power generation system according to another embodiment of the present disclosure.

As shown in FIG. 10, the neutral point of the power balance circuit 10 in the embodiment is grounded via an impedance circuit Z, so that the relevant circuits, such that the photovoltaic array and the power balance circuit, are grounded via Z before the subsequently connected power converter 20 is activated or connected to the system, ensuring the voltages of the relevant circuits relative to ground is lower than limit values required by safety regulations, and thereby ensuring the safety of the system.

Figure 11:
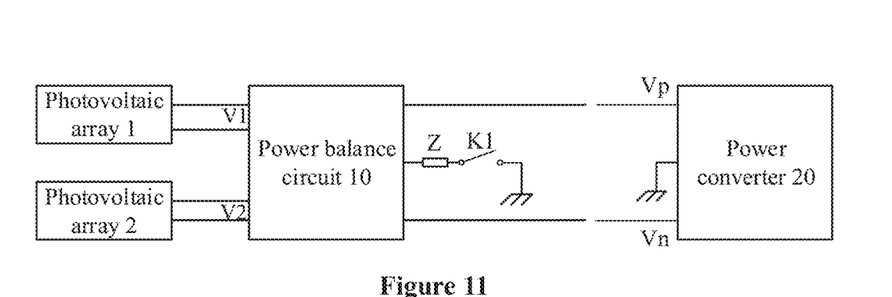
FIG. 11 shows a schematic structural diagram of a photovoltaic power generation system according to another embodiment of the present disclosure.

Reference is made to FIG. 11, which shows a schematic structural diagram of a photovoltaic power generation system according to another embodiment of the present disclosure. As shown in FIG. 11, based on the embodiment shown in FIG. 10, the power balance circuit in the embodiment further includes a first switching circuit K1 connected in series with the impedance circuit Z.

In an embodiment of the present disclosure, the first switching circuit K1 may be implemented by a controllable switch, such as a switch transistor, a contactor and a relay, which is not repeated herein.

In a case that the power converter 20 is not activated or not connected to the system, the first switching circuit K1 maintains in a closed state, so that the voltages of the relevant circuits, such as the photovoltaic array and the power balance circuit, relative to ground is lower than the limit values required by the safety regulations.

The neutral point of the power converter 20 is grounded, so that a voltage of each of two input terminals of the power converter 20 relative to ground is less than a limit value required by the safety regulations. Therefore, in a case that the power converter 20 is activated or connected to the system, the voltages of the related circuits relative to ground are clamped by the voltage of the power converter 20 relative to ground. In this case, even if the first switching circuit K1 is opened, the voltages of the related circuits, such as the photovoltaic array and the power balance circuit, relative to ground meet the safety regulations. Therefore, the first switching circuit K1 may be opened after the power converter 20 is connected to the system. In addition, no power loss is generated by the impedance circuit Z after the first switching circuit K1 is opened, thereby reducing the power loss of the photovoltaic power generation system.

Figure 12:
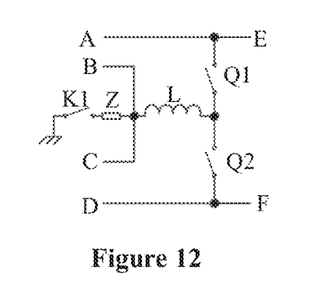
FIGS. 12 to 14 show three topology diagrams of a neutral point of a power balance circuit being grounded.

In an embodiment of the present disclosure, reference is made to FIG. 12, which shows a topology diagram of a neutral point of a power balance circuit being grounded. Based on the power balance circuit shown in FIG. 3a, a grounding impedance Z and a first switching circuit K1 are added.

Figure 13:
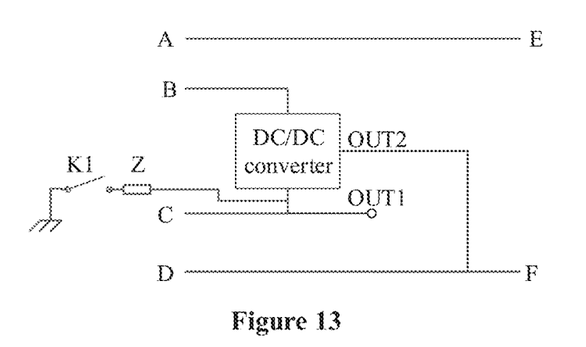

In another embodiment of the present disclosure, reference is made to FIG. 13, which shows another topology diagram of a neutral point of a power balance circuit being grounded. Based on the power balance circuit shown in FIG. 4, a grounding impedance Z and a first switching circuit K1 are added.

Figure 14:
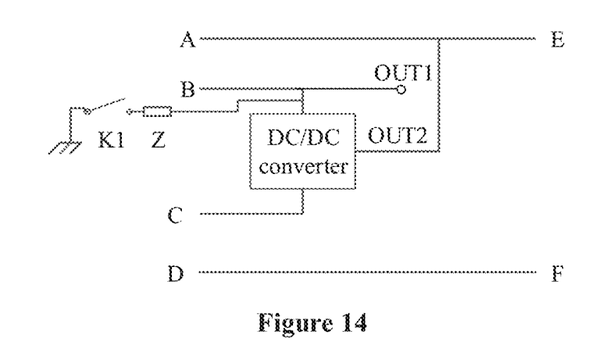

In another embodiment of the present disclosure, reference is made to FIG. 14, which shows another topology diagram of a neutral point of a power balance circuit being grounded. Based on the power balance circuit shown in FIG. 5, a grounding impedance Z and a first switching circuit K1 are added.

The operation principles of the power balance circuits shown in FIGS. 12 to 14 are the same as the operation principles of the power balance circuits shown in FIGS. 3a, 3b, 4 and 5, which are not repeated herein.

Generally, in order to facilitate field installation and maintenance and meet safety regulations, a control switch is connected in series between the power balance circuit and the power converter to perform breaking.

Figure 15:
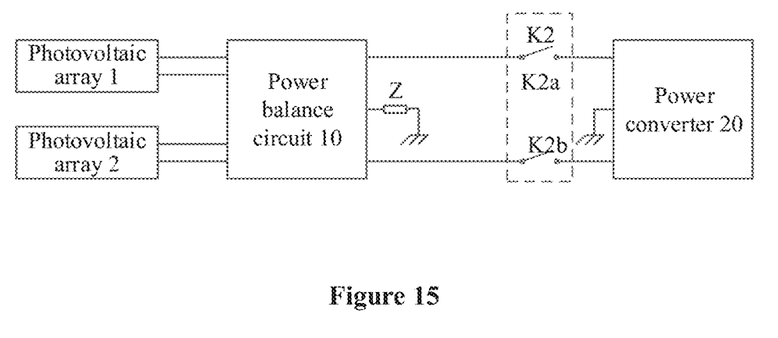
FIG. 15 shows a schematic structural diagram of a photovoltaic power generation system according to another embodiment of the present disclosure.

Reference is made to FIG. 15, which shows a schematic structural diagram of a photovoltaic power generation system according to another embodiment of the present disclosure.

As shown in FIG. 15, a second switching circuit K2 is connected in series between an output port of the power balance circuit 10 and an input terminal of the power converter 20.

In an embodiment of the present disclosure, the second switching circuit K2 includes a switch K2a connected in series with a positive input terminal of the power converter and a switch K2b connected in series with a negative input terminal of the power converter. The switches K2a and K2b may be linkage switches or switches independent of each other.

The second switching circuit K2 may be a switching transistor, a contactor or a relay, which is not repeated herein.

The second switching circuit K2 may be controlled to be closed or opened according to the actual requirements. For example, the second switching circuit K2 may be manually controlled to be closed or opened by a staff according to operation requirements.

In addition, the neutral point of the power balance circuit is grounded via the impedance circuit Z to form a multi-point grounding system with the subsequently connected power converter, ensuring the voltages of the photovoltaic array and the power balance circuit relative to ground are lower than or equal to the limit values required by the safety regulations before the second switching circuit K2 is closed.

The power converter 20 may control the voltages Vp and Vn relative to ground at the input terminals of the power converter 20 to be equal to each other and lower than a preset voltage. After K2 is closed, voltages V1 and V2 relative to ground of the two photovoltaic arrays may not be respectively equal to Vp and Vn. Thus, a voltage drop is formed on the impedance circuit Z, and a current relative to ground is generated. In addition, differences between the voltages of the power converter and the voltages of the photovoltaic arrays, that is, the difference between V1 and Vp and the difference between V2 and Vn, are positively correlated with the mismatching degree of the two photovoltaic arrays. Therefore, it is required to activate the power balance circuit 10 to balance the powers of the two photovoltaic arrays to solve the problem of the mismatch of the photovoltaic strings in series, ensuring that the differences between the voltages of the power converter and the voltages of the photovoltaic arrays are lower than the preset value and ensuring that the current flowing through impedance Z is small enough to avoid damage to the impedance Z.

In another application scenario, in a case that the power balance circuit is not activated, if the voltage relative to ground of the impedance circuit Z is less than the preset value, it indicates that the mismatching degree of the two photovoltaic arrays is within the allowable range and it is unnecessary to activate the power balance circuit; and if it is detected that the mismatching degree of the two photovoltaic arrays connected to the power balance circuit exceeds the allowable range (such as, the difference of the voltages the two photovoltaic arrays is greater than a preset value), the power balance circuit is activated.

Figure 16:
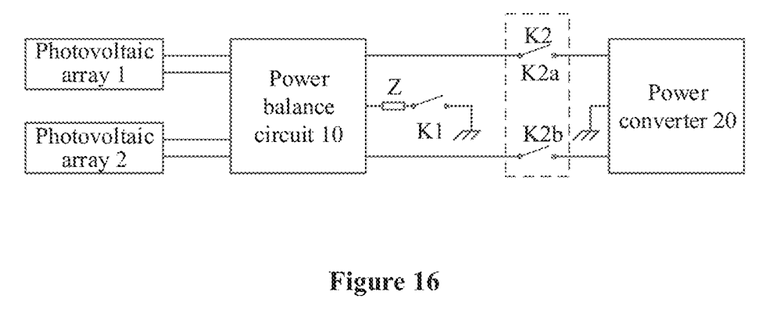
FIG. 16 is shows schematic structural diagram of a photovoltaic power generation system according to another embodiment of the present disclosure.

A photovoltaic power generation system is provided according to another embodiment of the present disclosure. As shown in FIG. 16, the difference between the system in this embodiment and the system in the embodiment shown in FIG. 15 is that, the impedance circuit Z connected to the neutral point of the power balance circuit 10 is grounded via a first switching circuit K1.

Before closing K2, K1 maintains in a closed state, so that the voltages relative to ground of the photovoltaic arrays and the power balance circuit are lower than or equal to the limit value required according to the safety regulations. After closing K2, K1 may be opened according to the actual requirements. Therefore, after it is detected that K2 is closed, K1 may be opened.

In an embodiment of the present disclosure, it may be determined whether K2 is closed by communicating with the power converter. Alternatively, it may be determined whether K2 is closed by detecting a voltage relative to ground of the neutral point of the power balance circuit. After K2 is closed, the voltage relative to ground of the neutral point of the front stage circuit (that is, the power balance circuit) of the power converter is clamped, thus the voltage relative to ground of the neutral point is low. Therefore, in a case that it is detected that the voltage relative to ground of the neutral point of the power balance circuit is less than the preset value, it is determined that K2 is closed. Alternatively, it may be determined whether K2 is closed by detecting an electrical signal of the front stage circuit. For example, in a case that the current of the front stage photovoltaic array is close to the current and the power converter or the voltage of the front stage photovoltaic array is close to the voltage of the power converter, it is determined that K2 is closed.

In an embodiment of the present disclosure, the power balance circuit may control K1 to be closed or opened, and the power converter may control K2 to be closed or opened. Alternatively, both K1 and K2 are controlled by a system-level controller, which is not described in detail herein.

With the photovoltaic power generation system according to the embodiments of the present disclosure, no power loss is generated on the impedance circuit Z after K1 is opened, thereby reducing the power loss of the photovoltaic power generation system.

The above embodiments of the method are described as a series of combinations of actions for convenience of the descriptions. However, those skilled in the art should understand that the present disclosure is not limited to the described sequence of the actions because some of the steps can be performed in a different sequence or simultaneously according to the present disclosure. In addition, those skilled in the art should further understand that embodiments described in the present disclosure are preferred embodiments, and the actions and modules in the embodiments are not necessarily required for the present disclosure.

It should be noted that technical features in the embodiments of the present disclosure may be substituted for or combined with each other. Each of the embodiments emphasizes the differences from others, and the same or similar parts between the various embodiments can be referred to each other. For the embodiments of the device, since the device embodiments are similar to the method embodiments, the description of device embodiments is relatively simple, and the related parts may refer to the description of the method embodiments.

The steps in the method according to the embodiments of the present disclosure may be adjusted in order, combined or deleted according to actual requirements.

Devices, and modules and sub-modules in the terminal according to the embodiments of the present disclosure may be combined, divided and deleted according to actual requirements.

In the embodiments of the present disclosure, it should be understood that terminals, devices and the methods disclosed may be implemented in other manners. For example, the terminal embodiments described above are merely illustrative. For example, the modules and sub-modules are divided based on logical functions, and the modules and sub-modules may be divided in other manners in actual implementations. For example, multiple sub-modules or modules may be combined or be integrated into another module. Some features may be ignored or not performed. In addition, coupling, direct coupling or communication shown or discussed in the present disclosure may be performed via some interfaces, and the indirect coupling or communication connection between devices or modules may be in electrical, mechanical or other forms.

Modules or sub-modules described as separate components may be or may not be separated physically. Components as modules or sub-modules may be or may not be physical modules or physical sub-modules, that is, the components may be located at one place or may be distributed on multiple network modules or sub-modules. Some or all of the modules or sub-modules may be selected according to actual requirements to achieve the objectives of the solutions according to the embodiments of the present disclosure.

In addition, functional modules or sub-modules in the embodiments of the present disclosure may be integrated in one processing module or may be separated physically. Alternatively, two or more modules or sub-modules may be integrated in one module. The integrated modules or sub-modules may be implemented in a form of hardware, or may be implemented in a form of a software functional module or a software functional sub-module.

It should be further noted that in the present disclosure, the relation terms such as "first" and "second" are only used to distinguish one entity or operation from another entity or operation, and do not necessarily require or imply that there is an actual relation or sequence between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

Based on the above description of the disclosed embodiments, those skilled in the art can implement or carry out the present disclosure. Various modifications to the embodiments are apparent to those skilled in the art, and the general principle in the present disclosure can be implemented in other embodiments without departing from the spirit or scope of the present disclosure. Therefore, the present disclosure is not limited to these embodiments described herein, but in accordance with the widest scope consistent with the principle and novel features disclosed herein.

The above descriptions are only preferred embodiments of the present disclosure. It should be noted that, for those skilled in the art, various improvements and modifications may be further made without departing from the principle of the present disclosure, and these improvements and modifications also fall within the protection scope of the present disclosure.

The invention claimed is:

1. A photovoltaic power generation system, comprising at least two photovoltaic arrays, at least one power balance circuit, and a power converter, wherein
   each of the photovoltaic arrays comprises at least two photovoltaic strings connected in parallel;
   each of two input ports of the power balance circuit is connected to at least one photovoltaic array, wherein the two input ports of the power balance circuit are connected to different photovoltaic arrays;
   an output port of the power balance circuit is connected to the power converter;
   the power balance circuit is configured to, in response to determining that a mismatching degree of the photovoltaic arrays respectively connected to the two input ports exceeds an allowable range, perform power transfer based on a difference between output powers of the photovoltaic arrays connected to the power balance circuit to control a difference between powers of two output terminals of the power balance circuit to be within a preset range.

2. The photovoltaic power generation system according to claim 1, wherein a neutral point of the power balance circuit is grounded via an impedance circuit.

3. The photovoltaic power generation system according to claim 2, wherein the power balance circuit further comprises a first switching circuit connected in series with the impedance circuit.

4. The photovoltaic power generation system according to claim 3, wherein a second switching circuit is connected in series between the output port of the power balance circuit and the power converter.

5. The photovoltaic power generation system according to claim 2, wherein a second switching circuit is connected in series between the output port of the power balance circuit and the power converter.

6. The photovoltaic power generation system according to claim 1, wherein
   each of the input ports of the power balance circuit is connected to at least two photovoltaic arrays connected in parallel; or
   each of the input ports of the power balance circuit is connected to an output terminal of a DC/DC converter, and an input terminal of the DC/DC converter is connected to at least one photovoltaic array; or
   each of the input ports of the power balance circuit is connected to at least two DC/DC converters of which output terminals are connected in parallel, and an input terminal of each of the DC/DC converters is connected to at least one photovoltaic array.

7. The photovoltaic power generation system according to claim 1, wherein
   the photovoltaic power generation system comprises two or more power balance circuits; and
   input ports of the power balance circuits are connected to different photovoltaic arrays, and output ports of the power balance circuits are connected in parallel.

8. The photovoltaic power generation system according to claim 1, wherein,
   a first input port of the power balance circuit comprises a first input terminal and a second input terminal, a second input port of the power balance circuit comprises a third input terminal and a fourth input terminal, and the output port of the power balance circuit comprises a first output terminal and a second output terminal, and
   the first input terminal is connected to the first output terminal, and the fourth input terminal is connected to the second output terminal;
   a series switching branch is connected between the first output terminal and the second output terminal, and the series switching branch comprises at least two control switches;
   the second input terminal and the third input terminal are connected, and then are connected to a common point of the two control switches in the series switch branch via an inductive impedance; and
   a common point of the second input terminal and the third input terminal serves as the neutral point of the power balance circuit.

9. The photovoltaic power generation system according to claim 1, wherein,
   a first input port of the power balance circuit comprises a first input terminal and a second input terminal, a second input port of the power balance circuit comprises a third input terminal and a fourth input terminal, and the output port of the power balance circuit comprises a first output terminal and a second output terminal, and
   in a case that the power balance circuit comprises a DC/DC converter, the second input terminal and the third input terminal are respectively connected to two input terminals of the DC/DC converter, a positive output terminal of the DC/DC converter is connected to the first output terminal of the power balance circuit, the first input terminal is connected to the first output terminal, the fourth input terminal is connected to the second output terminal, and the positive input terminal of the DC/DC converter serves as the neutral point of the power balance circuit; or the second input terminal and the third input terminal are respectively connected to two input terminals of the DC/DC converter, a positive output terminal of the DC/DC converter is connected to the second output terminal of the power balance circuit, the first input terminal is connected to the first output terminal, the fourth input terminal is connected to the second output terminal; and a negative output terminal of the DC/DC converter serves as the neutral point of the power balance circuit.

10. A method for controlling power balance, comprising:

detecting a mismatching degree of photovoltaic arrays respectively connected to two input ports of a power balance circuit; and in response to determining that the mismatching degree exceeds an allowable range, activating the power balance circuit and controlling the power balance circuit to perform power transfer based on a difference between output powers to control a difference between powers of two output terminals of the power balance circuit to be within a preset range.

11. The method according to claim 10, wherein a neutral point of the power balance circuit is grounded via an impedance circuit and a first switching circuit that are connected in series, and the method further comprises:

maintaining a first switching circuit in a closed state before closing a second switching circuit; and controlling the first switching circuit to be opened after closing the second switching circuit.

* * * * *